(12) United States Patent
Willard, III et al.

(10) Patent No.: US 11,107,148 B2
(45) Date of Patent: Aug. 31, 2021

(54) PACKING STATION AND MULTI-MODAL INTERFACE

(71) Applicant: America's Collectibles Network, Inc., Knoxville, TN (US)

(72) Inventors: George F. Willard, III, Knoxville, TN (US); Mahendra Satrasala, Knoxville, TN (US); Lei Cao, Oak Ridge, TN (US); Dustin Cole, Louisville, TN (US); Shannon Meade, Knoxville, TN (US); Matthew Cardwell, Knoxville, TN (US)

(73) Assignee: America's Collectibles Network, Inc., Knoxville, TN (US)

( * ) Notice: Subject to any disclaimer, the term of this patent is extended or adjusted under 35 U.S.C. 154(b) by 1369 days.

(21) Appl. No.: 14/298,497

(22) Filed: Jun. 6, 2014

(65) Prior Publication Data

US 2014/0360141 A1 Dec. 11, 2014

Related U.S. Application Data

(60) Provisional application No. 61/832,361, filed on Jun. 7, 2013.

(51) Int. Cl.
*G06Q 30/06* (2012.01)
*B65B 57/00* (2006.01)
*B65B 65/00* (2006.01)

(52) U.S. Cl.
CPC ......... *G06Q 30/0635* (2013.01); *B65B 57/00* (2013.01); *B65B 65/00* (2013.01)

(58) Field of Classification Search
CPC ........... G06Q 10/083; G06Q 10/08345; G06Q 50/32; G06Q 10/0835; G06Q 10/8032;
(Continued)

(56) References Cited

U.S. PATENT DOCUMENTS

| | | | | |
|---|---|---|---|---|
| 7,689,465 B1 * | 3/2010 | Shakes | ................... | G06Q 10/08 705/27.1 |
| 7,707,008 B1 * | 4/2010 | Champlin | ............ | G06Q 10/087 700/115 |

(Continued)

OTHER PUBLICATIONS

Postal History Corner, "Canadian ATM Stamp Vending Kiosks: 2012-2013" http://postalhistorycorner.blogspot.com/2013/01/stamp-vending-kiosk-trials.html, Jan. 13, 2013 (Year: 2013).*

*Primary Examiner* — George Chen
(74) *Attorney, Agent, or Firm* — Nelson Mullins Riley & Scarborough LLP; Anthony A. Laurentano (57) ABSTRACT

Exemplary embodiments of the present application provide a packing system for an order fulfillment process. The packing system may include a scanner for scanning a barcode to retrieve a product identifier that is used to look up an order in a package database. A packager may package the product and a scale may weigh the packaged product. Using the weight from the scale and the order information from the package database, postage information for the packaged product may be retrieved from a postage database. One or more labels for the product may be printed based on the postage information and the order information, and the labels may be affixed to the packaged product. A workstation may display an interface providing an overview of the process, a time required to perform the steps in the process, and any errors associated with steps in the process.

7 Claims, 10 Drawing Sheets

(58) Field of Classification Search
CPC ........ G06Q 20/10; G06Q 20/12; G06Q 30/00; G06Q 10/06311; G06Q 10/06316; G06Q 10/0834; G07B 17/00661; G07B 2017/00064; G07B 2017/00685; G07B 2017/00701; G07B 2017/00717; G07B 17/00024; G07B 17/00508; G07B 2017/00145; G07B 2017/0037; G07B 2017/00443; G07B 2017/00588; G07B 2017/0062; B65B 57/00

See application file for complete search history.

(56) References Cited

U.S. PATENT DOCUMENTS

| | | | |
|---|---|---|---|
| 2003/0083890 A1* | 5/2003 | Duncan | B65D 5/5035 705/28 |
| 2007/0288659 A1* | 12/2007 | Zakarian | G06F 21/645 709/246 |
| 2008/0033782 A1* | 2/2008 | Doyle | G06Q 10/00 705/7.29 |
| 2008/0099562 A1* | 5/2008 | Kim | B65B 5/103 235/462.01 |
| 2010/0223173 A1* | 9/2010 | Kadaba | B07C 3/00 705/34 |

* cited by examiner

PACKING STATION AND MULTI-MODAL INTERFACE

RELATED APPLICATIONS

The present application claims priority to U.S. Provisional Patent Application Ser. No. 61/832,361, filed on Jun. 7, 2013 and entitled "Packing Station and Multi-Modal Interface." The contents of the aforementioned application are incorporated herein by reference.

BACKGROUND

Vendors, particularly in home shopping industries involving telephone ordering, mail ordering, or e-commerce, often need to package orders to be shipped to customers. In some circumstances, product packaging may be done manually with a worker inserting orders into packages. In order to increase efficiency over a manual packaging scheme, automated packagers have been introduced. Such packagers may accept a product, surround the product with packaging material, and seal the package for shipment. One example of an automated packaging system is the Priority Pak® Automated Packaging System by Sealed Air Corporation of Elmwood Park, N.J.

However, packagers perform only a limited role in the order fulfillment process. Therefore, conventional shipment systems employing automated packagers still require a significant amount of operator interaction in order to fulfill an order. Accordingly, skilled operators must be trained to use the packagers, and further must be trained to perform any other necessary steps in order to prepare an order for shipment. This process may be slow and cumbersome, as well as error prone.

For example, even while using an automated packaging system, a worker may still need to match a product to an appropriate mailing label designating the recipient of the product, confirm that the package contents match the recipient's order, prepare postage for the shipped product (which may itself involve a number of steps), operate the automated packaging system (including identifying problems such as jams and repairing the packaging system when such problems occur), retrieve packaging materials and refill the automated packaging system at appropriate intervals, keep track of the status of shipped orders, and myriad other tasks. Performing these tasks may decrease operator efficiency and therefore reduce the number of packages that a worker can ship in a given day. Moreover, if the worker incorrectly performs any single task in the shipping process, the shipped product may never arrive at its destination. These tasks may be complicated since automated packaging systems typically may not include an interface that allows the worker to track which tasks have been completed for a given order, and which remain to be done.

Moreover, in some cases multiple different types of postage products may be available for a particular shipment. The postage products available may depend on the size and weight of the package being shipped, the destination of the package, the source of the package, the amount of time available to get the package to its destination, etc. In an order fulfillment center where thousands of packages may be shipped in a given day, it may not be practical to collect all the necessary information that would allow for the selection of a postage product that optimally balances these considerations. Thus, a fulfillment center may spend more money than necessary on postage products and/or may select postage products (out of convenience or necessity) that do not match well with the shipper's needs.

Exemplary embodiments of the present invention address these and other problems associated with the packaging and shipment of orders.

SUMMARY

Exemplary embodiments of the present application provide a packing system that simplifies the order fulfillment process and allows for increases in vendor efficiency while decreasing training costs for order fulfillment personnel. In real-world tests, the use of exemplary embodiments described herein decreased the amount of worker training time required but nonetheless doubled the worker's throughput, resulting in drastically increased efficiency and cost savings.

According to an exemplary embodiment, a packing system may be provided. The packing system may include a conveyor for conveying a product through the packing system and a packager for placing the product in packaging to create a packaged product.

A package database may store information related to an order associated with the product. For example, the package database may store one or more entries, where each entry may include a list of items ordered by a customer, and a delivery destination of the customer. A workstation may retrieve the information related to the order.

In some embodiments, a barcode scanner may be provided for scanning a barcode on the product. The barcode may be associated with an identifier of the product. In such an embodiment, the workstation may retrieve the information related to the order from the package database based on the identifier.

A scale may measure a weight of the product. In some embodiments where multiple orders of similar (or the same) products are being shipped, the workstation may store a weight measured by the scale for one of the similar products and lock in the weight for use with a future orders of the same product.

Using the information related to the order and the measured weight, the workstation may consult a postage database storing postage rates. The workstation may search the postage database return postage information to be used to ship the product. For example, the postage information may include a shipping company and a postage amount. The shipping company and/or postage amount may be selected based on one or more metrics, such as reducing an amount of shipping time required, reducing a cost of the shipment, or a weighted combination of shipping time and cost. In some embodiments, the workstation may confirm the postage information retrieved from the database after a shipping company and/or postage amount has been selected.

A printer may print a label to be affixed to the packaged product, or may print information directly on the packaged product. In some embodiments, the printer may print the label and affix the label to the packaged product. The printer may print the information on the label or on the packaged product based on information retrieved from the package database and/or the information related to the order retrieved from the package database. In some embodiments, the printer may print postage for the packaged product based on the postage information retrieved from the postage database.

In some embodiments, one or more cameras and/or light sources may be provided at selected locations in the packing system, such as at the packager and/or at an output of the packing system.

When the order is finalized and sent to an output of the packing system to be shipped, the workstation may update the information related to the order in the package database. For example, the workstation may update a status of the order to "shipped."

The workstation may be connected to one or more of the components of the packing system through suitable interfaces. The workstation may be a multi-modal workstation capable of being in one or more of a plurality of modes. For example, the modes may include: a pack mode wherein the product is placed in the packaging by the packager; a look up mode wherein the display displays information from the package database for a selected order; a shipping mode wherein the workstation searches the postage database based on the information related to the order stored in the package database and the weight measured by the scale, and returns postage information to be used to ship the product; and a pack and print mode wherein the product is placed in the packaging by the packager and the printer prints a label based on information in the package database.

In another embodiment, a non-transitory computer-readable storage medium storing instructions may be provided. The instructions may cause a processor to perform a number of steps. For example, the instructions may cause the processor to: (a) display an interface; (b) identify an order to be shipped, wherein an identifier of the order to be shipped is displayed on the interface; (c) retrieve order information related to the order to be shipped from a package database; (d) retrieve a weight of the package; (e) shop for postage based on the order information and the weight; (f) print information on one or more labels, or directly on the package, based at least on the order information and the postage; and (g) update the order information in the package database.

In some embodiments, an amount of time required to perform one or more of these steps may be displayed on the interface. Furthermore, the interface may display an error dialog for displaying an error message associated with any of steps (b)-(g).

In further embodiments, a method of assembling a packaged product may be performed in a workstation. The method may include receiving an item at an input of a packing system. Order information related to the item may be retrieved from a package database. The item may be inserted into a packaging material to create a packaged product, and a weight of the packaged product may be retrieved.

Based on the order information retrieved from the package database and the weight, a postage rate for shipping the package may be identified. One or more labels may be printed for the package based on at least the order information and the postage rate. The labels may be affixed to the package. Alternatively, the postage may be printed directly on the package. Information in the package database may be updated when the package is finalized and ready for shipping.

DETAILED DESCRIPTION

Figure 1:
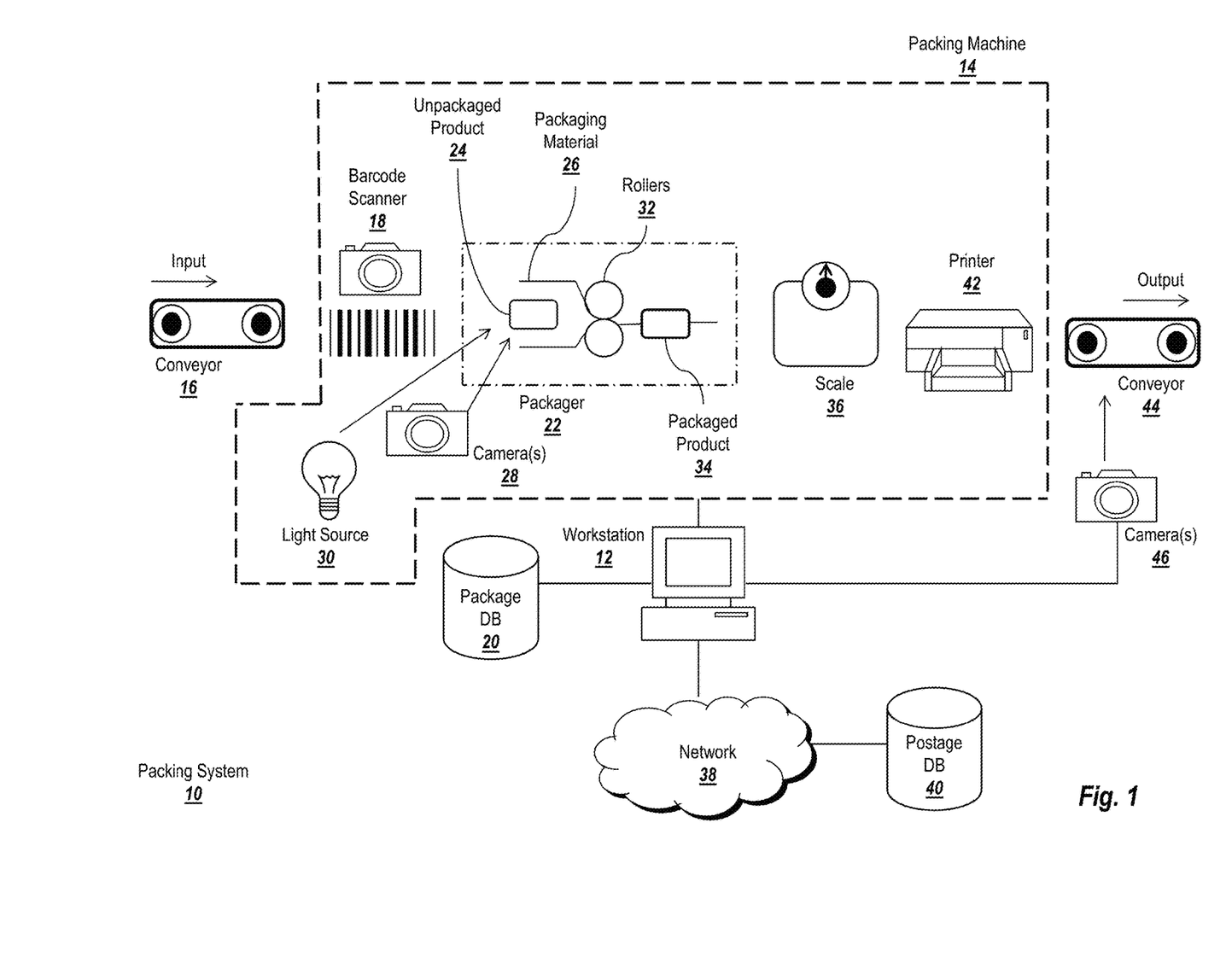
FIG. 1 depicts an exemplary packing station.

The present application provides an improved packing system for packaging an order and preparing the order for shipment. Using the exemplary packing system described herein, efficiencies in the preparation of orders for shipment may be readily realized over traditional packaging techniques. An overview of an exemplary packing system 10 according to one embodiment of the present invention is depicted in FIG. 1.

A workstation 12 may provide a display showing the status of an order as the order moves through the packing system 10. The workstation may be a suitable electronic device, such as a suitably programmed personal computer, a laptop, a tablet computer, a smart phone, or a custom electronic device. The workstation may receive commands from a user through a suitable interface, such as a keyboard, mouse, or touch screen.

The workstation may be used to monitor and/or control the various components of the packing system 10, and may therefore be connected to the components of the packing system through suitable interfaces. A suitable interface may be any interface suitable for carrying information from a component of the packing system 10 to the workstation 12 and vice versa. Suitable interfaces may include a wireless transmission medium such as radio waves, copper wire, fiber optic cabling, and other transmission mediums, and/or a combination of transmission mediums.

The workstation 12 may be connected to packing machine 14. The packing machine 14 may include components for accepting, at an input of the packing machine 14, an unpackaged product or products and assembling, at an output of the packing machine 14, a packaged product that is labeled with shipment information and postage and ready to be sent to a shipping company for shipping.

A conveyor 16 may be provided at the input of the packing machine 14 for moving an unpackaged product or products into the packing machine. The conveyor 16 may be, for example, a conveyor belt or belt drive, a series of carts or containers mounted on or suspended from rails, a ramp, a magnetic levitation conveyor, etc. Additionally, one or more conveyors 16 may be provided to move the product or products through the packing machine 14 to the various components inside the packing machine 14.

A barcode scanner 18 may scan a barcode on the unpackaged product. The barcode may correlate to an identifier, such as an identification number, which identifies an order associated with the product. In some embodiments, the product may be identified by means other than a barcode. For example, the product may be identified by an identification number, which is captured by a camera and recognized by optical character recognition (OCR) software. Alternatively, a quick response (QR) code may be utilized, or a radio frequency identifier (RFID) tag, among other suitable alternatives for associating an identifier with a product.

In some embodiments, the barcode scanner 18 may be used to request that the packing system 10 be resupplied. For example, the packing system 10 may make use of supplies such as packaging material, labels, ink, boxes, etc. A small local cache of these supplies may be stored in close proximity to the packing machine 14, while a larger collection of these supplies may be stored elsewhere, such as remotely in a central supply repository. The supplies at the local cache may be provided with an identifying barcode. For example, the supplies may be stored in a bin, box, or other container and a barcode identifying an individual supply or group of supplies may be affixed to the bin.

If a worker at the workstation 12 notes that one or more of these supplies is running low in the local cache, the worker may scan the barcode on the bin with the barcode scanner 18. In response, the workstation 12 may recognize that the identifier associated with the scanned barcode belongs to a supply, and may request resupply from the central supply repository. The request may be sent, for example, to a workstation in the central supply repository where an employee may deliver the supplies to the local cache. In some embodiments, the supplies may be automatically sent to the local cache, for example using the conveyor 16, a separate conveyor, or a robot, among other possibilities.

In another embodiment, the packing system 10 may include one or more sensors, such as scales, to determine when one of the supplies is running low. When the sensors detect that the quantity of a particular supply drops below a predetermined threshold, the sensor may send a signal to the workstation 12 to trigger the workstation 12 to request more supplies.

In some embodiments, the request for resupply may be associated with a priority. Requests may be fulfilled from the central location based on their priorities. If the request is submitted by scanning a barcode of the supply, the priority of the request may be elevated by scanning the barcode multiple times. For example, scanning the barcode once may cause a low-priority request to be sent to the central supply repository, while scanning the barcode a second time elevates the request to medium priority. Scanning the barcode a third time may elevate the request to a high priority request.

In another embodiment where sensors generate automatic requests, priority may be set based on a reading of the sensor. For example, when the supply drops below a first predetermined threshold (e.g., only 100 labels remain), a first low-priority request may be generated and sent to the central supply repository. If the supply then drops below a second predetermined threshold (e.g., only 50 labels remain), then the low-priority request may be elevated to a moderate priority request. If the supply continues to drop below a third predetermined threshold (e.g., only 10 labels remain), then the request may be elevated to a high-priority request.

After the product (or an item associated with the product such as a packing slip located on or near the product or on the conveyor) is scanned with the barcode scanner and an associated order identifier is retrieved, the workstation 12 may query a package database 20 to retrieve information related to the order. The package database 20 may include one or more entries indexed by order identifier. The entries may map an order identifier to order information, such as a name and shipping address of a recipient of the order, payment information for the order, items ordered, quantity of items ordered, a requested shipping speed, promotional materials to be included when shipping the order, and other information related to the order.

In some exemplary embodiments, the package database 20 may be stored in a memory of the workstation 12 or remotely from the workstation 12. The package database 20 may be embodied using any suitable data structure, such as a table, matrix, etc.

The unpackaged product 24 may be provided to a packager 22 for inserting the unpackaged product into a shipping package. In one embodiment, an unpackaged product 24 is placed between two sheets of packaging material 26. A camera 28 may provide the workstation 12 with image data from inside the packager 22 in order to ensure that products are being properly packaged. The image data may include static images and/or video data. The image data may be displayed on an interface of the workstation 12. If a problem develops in the packager 22, the image data may allow a user of the workstation 12 to diagnose and repair the problem.

In order to ensure that image data captured by the camera 28 are clear, a light source 30 may be provided near the camera 28. For example, the light source 30 may be a light emitting diode (LED) light strip powered by the packing machine 14. The light source 30 may be provided in the vicinity of the unpacked product 24 for illuminating the unpacked product 24 as the unpacked product is placed in the packaging material 26 and sent through rollers 32.

The rollers 32 may press the packaging material 26 around the unpackaged product 24 in order to seal the packaging material 26 around the unpackaged product 24, thus creating a packaged product 34.

The packager 22 of FIG. 1 is intended to be exemplary. In other embodiments, the unpackaged product 24 may be placed into a box or stuffed into an envelope. One example of a packager 22 suitable for use with exemplary embodiments is the Priority Pack® Generation 2 packaging system of Sealed Air Corporation.

The packaged product 34 may be moved to a scale 36 to be weighed. The weight of the packaged product may be transmitted from the scale 36 to the workstation 12. The weight may be resolvable at a number of different resolutions, such as ounces, pounds, and/or kilograms. As used herein, a "weight" may also include a mass.

Using the received weight of the packaged product, the workstation may determine a preferred shipping company, shipping method, and shipping rate to be used to ship the packaged product. For example, the workstation 12 may consult a postage database 40 including postage rates for a plurality of shipping companies. The workstation 12 may access the postage database 40 through a network 38, such as the Internet.

The postage database 40 may accept one or more parameters, such as a source location from which the shipment is to be sent, a destination location to which the shipment is to be sent, a weight of the package, and a desired shipment speed or priority, and may return postage rates or bids for one or more shipping companies to ship the package to the desired location given the desired speed/priority. The workstation 12 may select one of the shipping companies based on one or more metrics, such as the lowest cost to ship the package to the destination in a given time, or the fastest shipping time, or a weighted combination of rate and shipping time.

After selecting a shipping company and confirming the postage rate for the shipping company, the packaged product 34 may be sent to a printer 42 which prints one or more labels and/or packing slips and optionally affixes the labels to the packaged product 34. The labels may include a destination name and address as retrieved from the package database 20 and a source name and address to be used as a return address. The source name and address may be predetermined and programmed into the printer 42 and/or the workstation 12. Alternatively, the printer may print delivery information and/or postage information directly on the packaged product 34.

In some embodiments, the printer may print the labels but refrain from affixing the labels to the packaged product 34.

The labels may be saved in order to be manually affixed to the packaged product 34 at a later time. Such an embodiment may be particularly useful for a "bulk" order in which multiple packages including the same or similar items are to be shipped. In such a bulk order, the items may be quickly packaged while the printer 42 prints labels for the packages. The labels may then be affixed to the packages.

If a shipping company and postage rate were selected using the postage database 40, and the shipping company allows for such capabilities, the printer 42 may further print postage for the package and print the postage on one of the labels.

At this time, the packaged product 34 has now been labeled and prepared for shipping, and hence may be provided to a conveyor 44 at an output of the packing machine 14. The conveyor 44 may be similar to the conveyor 16.

At the output of the packing machine 14, one or more cameras 46 may monitor the conveyor 44 in order to ensure that packages are exiting the packing machine 14 as expected. The output of the one or more cameras 46 may be provided to the workstation 12 so that problems with the conveyors 44 may be diagnosed from an interface of the workstation and swiftly corrected.

The configuration depicted in FIG. 1 is intended to be exemplary only. The present invention may be embodied in a system with more components, fewer components, or components arranged in a different order than those depicted in FIG. 1.

Figure 2:
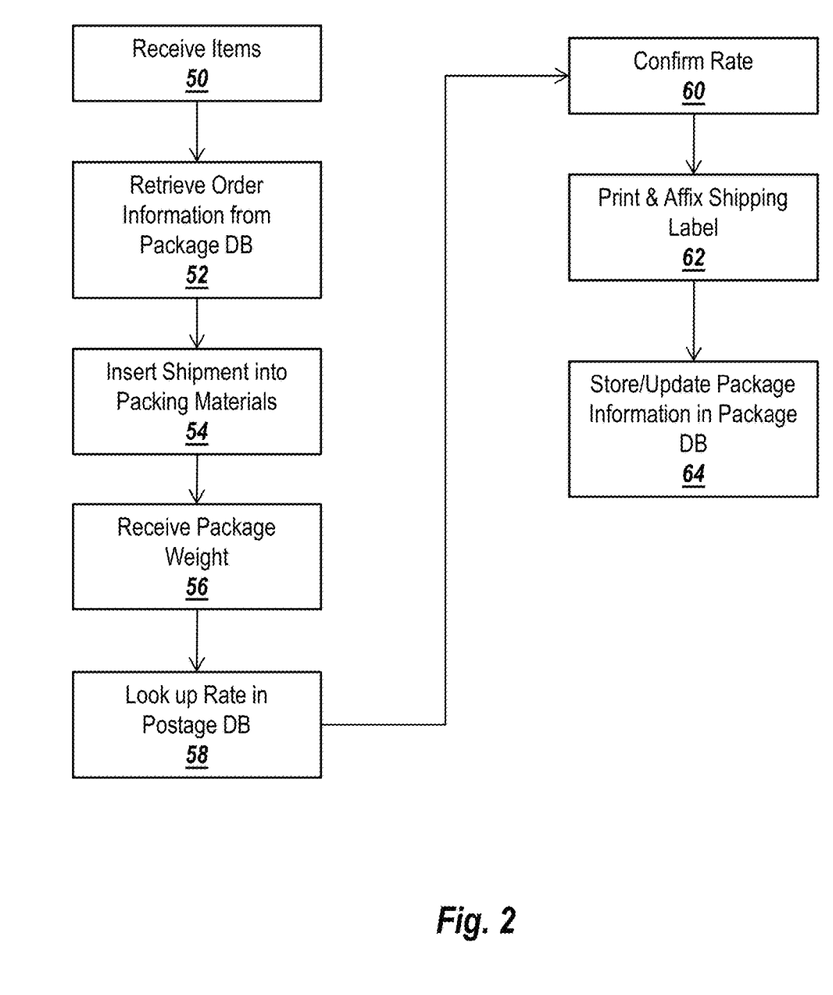
FIG. 2 depicts an exemplary procedure performed by the packing station.

The packing system 10 of FIG. 1 may be used in conjunction with an exemplary process for preparing orders for shipping. FIG. 2 is a flowchart describing such an exemplary process.

At step 50, one or more items may be received. For example, a carrier element, such as a container, bin, bag, envelope, tote, or box, containing one or more products corresponding to all or part of a customer order may be received at an input of the packing machine 14. The carrier element may further carry an invoice and/or promotional materials to be packaged with the order. The carrier element and/or products may be marked with an identifier, such as a barcode, that identifies an order associated with the items. The barcode may be placed, for example, on an invoice placed on, near, or in the carrier element.

At step 52, order information for the one or more items may be retrieved from a package database. For example, the barcode scanner 18 may scan the barcode attached to the items in order to retrieve an order identifier, such as an identification number. The workstation 12 may look up the order identifier in the package database 20 and retrieve order information related to the order.

At step 54, the items making up a shipment may be inserted in to packing materials to create a packaged product. In one embodiment, the items may be wrapped using a packager 22. In another embodiment, the items may be placed in a shipping container, such as a box or an envelope. In some embodiments, a camera may transmit images of the packaging process to the workstation 12, which may display the images on an interface.

At step 56, the packaged product may be weighed. In one embodiment, the packaged product may be placed on a scale 36 in order to determine the weight of the packaged product. The weight may be transmitted to the workstation 12 and displayed on an interface of the workstation 12.

It is noted that steps 54 and 56 may be reversed. For example, the unpacked product may be weighed and then placed into the packing materials. In some embodiments, the weight of the packing materials may be predetermined and/or calculated based on an amount of packing material required to package the product. The weight of the packing materials may be stored in a memory of the workstation, and the weight of the packing materials may be added to the weight of the unpackaged product when the unpackaged product is weighed.

At step 58, the package weight and/or the order information may be used to look up postage information in a postage database 40. The postage information may include a shipping company and/or a postage rate for shipping the packaged product. Multiple shipping companies, shipping speeds, service levels, and/or postage rates may be available for a given shipment. Accordingly, at step 58, the workstation 12 may search the postage database for a preferred company, speed, service level, and/or rate. The workstation 12 may select these items by choosing the shipping company that has the lowest rate for a delivery service which is expected or guaranteed to deliver the package at or before a requested date or time. Alternatively, the workstation 12 may select these items by choosing a shipping company that will deliver the package the fastest. In another embodiment, the workstation 12 may make a selection based on a weighted combination of two or more of the above-identified items, among other possibilities.

At step 60, the rate may be confirmed and postage may be ordered or purchased. After selecting a preferred shipping company, speed, service level, and/or rate at step 58, the workstation may contact the postage database 40 in order to purchase postage for the package. This step may involve requesting postage from the selected company at the requested speed, service level, and/or rate. The workstation 12 may authorize a payment to the selected company, or may defer payment to a later time. The postage database 40 may return an identifier, such as a shipping number, to the workstation to be printed on the shipment and/or stored in the package database 20.

At step 62, one or more shipping labels may be printed and affixed to the packaged product. The shipping label(s) may be printed based on the order information retrieved from the package database and/or the postage information retrieved from the postage database. The shipping label(s) may include a source address representing the return address and a customer address representing the destination address. The source address may be preprogrammed or predetermined, while the destination address may be retrieved from the package database 20 at step 52. The shipping label(s) may also include printed postage, which may be printed based on the postage information retrieved from the postage database 40 at step 58. The label(s) may be affixed to the packaged product by the printer 42.

Alternatively, the shipping information may be printed directly onto the packaging of the packaged product, without the use of a separate label or labels.

At step 64, the order information stored in the package database may be updated. For example, the order information may be updated to reflect a status of "shipped" for the order.

If a problem occurs at any of the above steps, an error may be generated. For example, the workstation 12 may store one or more error rules.

An error rule may include an error condition, which represents a problem with one or more components of the packing system 10. Examples of error conditions include, but are not limited to, a problem with the order (e.g., the weight of the order as measured by the scale does not come within a predetermined tolerance of an expected weight based on the items ordered), a jam at a location in the packing machine 14, a malfunction of the network 38 or the postage database 40 which prevents a postage rate from being identified, a malfunction of one of the components of the packing system 10 or a failure of one of the links connecting the components to the workstation 12, and running out of supplies (e.g., printing labels or ink), among other conditions. The error conditions need not be directly related to a malfunction, but may also flag certain conditions for follow-up by an operator. For example, an error condition may be that a destination for an order is an international address, and hence the order requires supervisor authorization prior to shipping.

An error rule may also include a message to be displayed on an interface of the workstation 12, in the event that an error condition is fulfilled. The message may direct an operator of the workstation 12 to take further action to resolve the error. For example, if the error condition is that the shipping destination of the order is an international address, the error message may direct the operator of the workstation 12 to request authorization from a supervisor.

An error rule may further include device-executable instructions for presenting additional interfaces for resolving certain errors. In the international address example above, the error rule may cause a prompt to be displayed, which allows a supervisor to enter the supervisor's authorization code. Once the authorization code is entered, the error is resolved and operation may proceed as normal. In another example, if the error condition relates to a lack of supplies such as printer ink, the workstation 12 may request resupply from a central supply repository.

Using the system as described in FIGS. 1 and 2, efficiencies may be introduced that reduce requirements for employee training and the number of employees required to prepare orders for shipment. For example, in one experiment, switching from a manual shipping procedure using an automatic packager to a shipping procedure employing a packing system modeled on the exemplary packing system 10 increased employee throughput by 100%.

FIGS. 3 and 4A-4F depict exemplary interfaces for the workstation 12 during the various steps of FIG. 2. In some embodiments, the workstation 12 may be a multi-modal workstation such that some or all of the steps of FIG. 2 may be carried out, depending on which mode the workstation is in.

Figure 3:
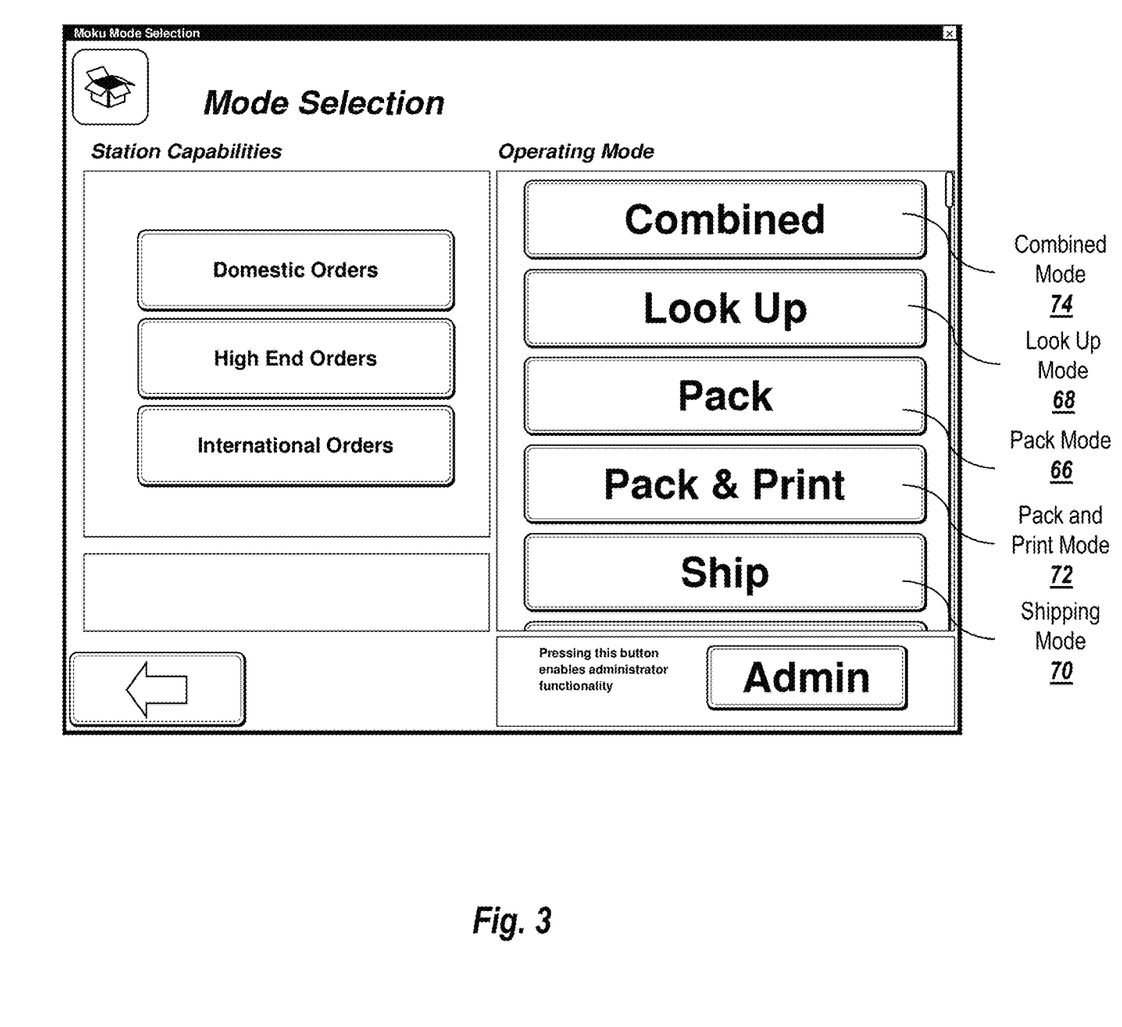
FIG. 3 depicts an exemplary multi-modal interface for the packing station.

FIG. 3 depicts an exemplary multi-modal interface 68 for selecting an operating mode of the workstation. The modes may include, for example: a "pack" mode 66 wherein the product is placed in the packaging by the packager (step 54); a "look up" mode 68 wherein the display displays information from the package database for a selected order (step 52); a "shipping" mode 70 wherein the workstation searches the postage database based on the information related to the order stored in the package database and the weight measured by the scale, and returns postage information to be used to ship the product (steps 58 and/or 60); a "pack and print" mode 72 wherein the product is placed in the packaging by the packager and the printer prints the label based on information in the package database (steps 54 and 62), and a packing slip to be included in the shipment with the rest of the items is also printed; a "bulk" mode (not pictured) in which a plurality of the same or similar orders are placed into packaging, and corresponding labels are printed for the plurality of orders without affixing the labels to the packaging; and a "combined" mode 74 which performs all of the steps described in FIG. 2.

Figure 4A:
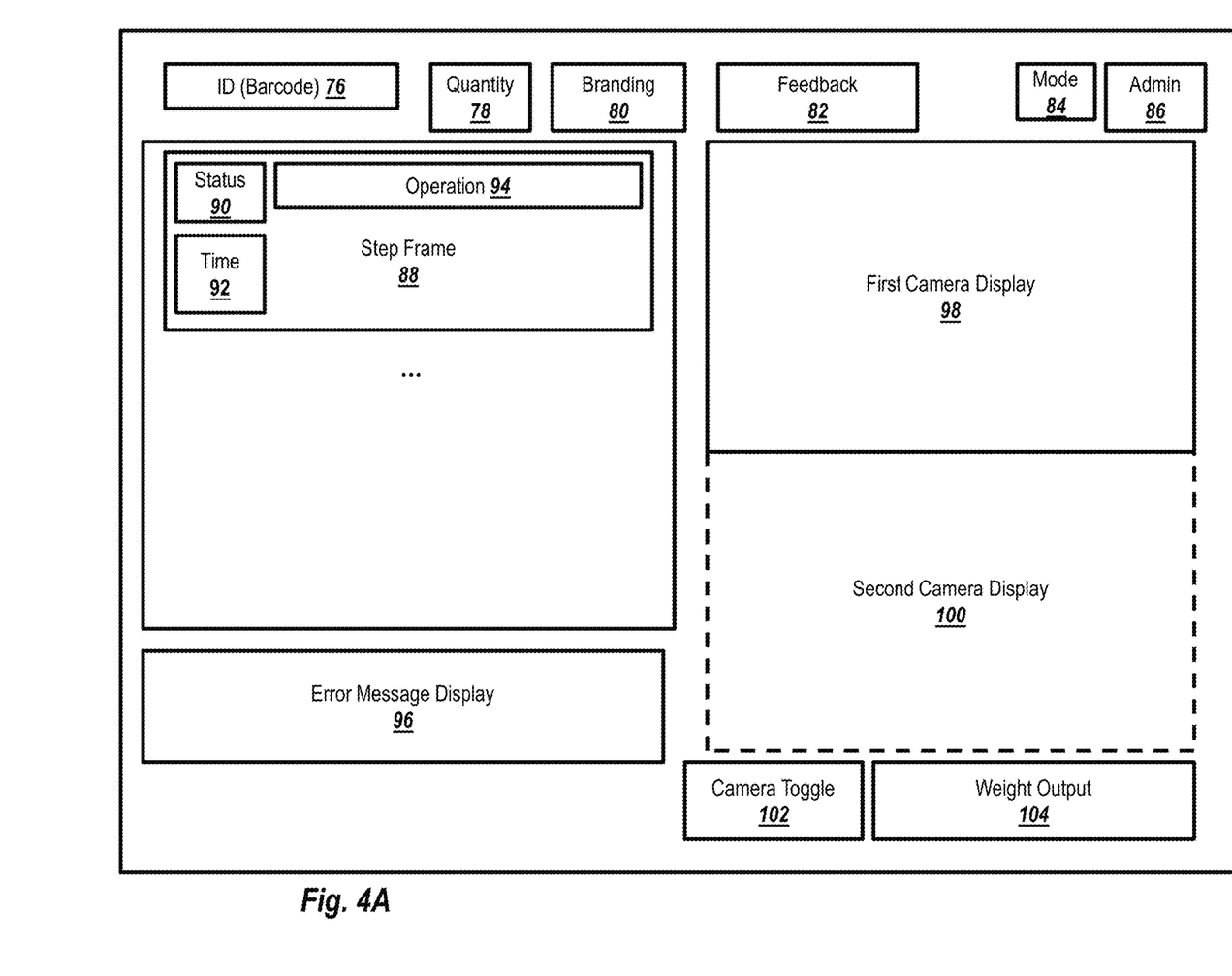
FIGS. 4A-4F depict exemplary interfaces for the packing station at different stages of the procedure depicted in FIG. 2.
Figure 4B:
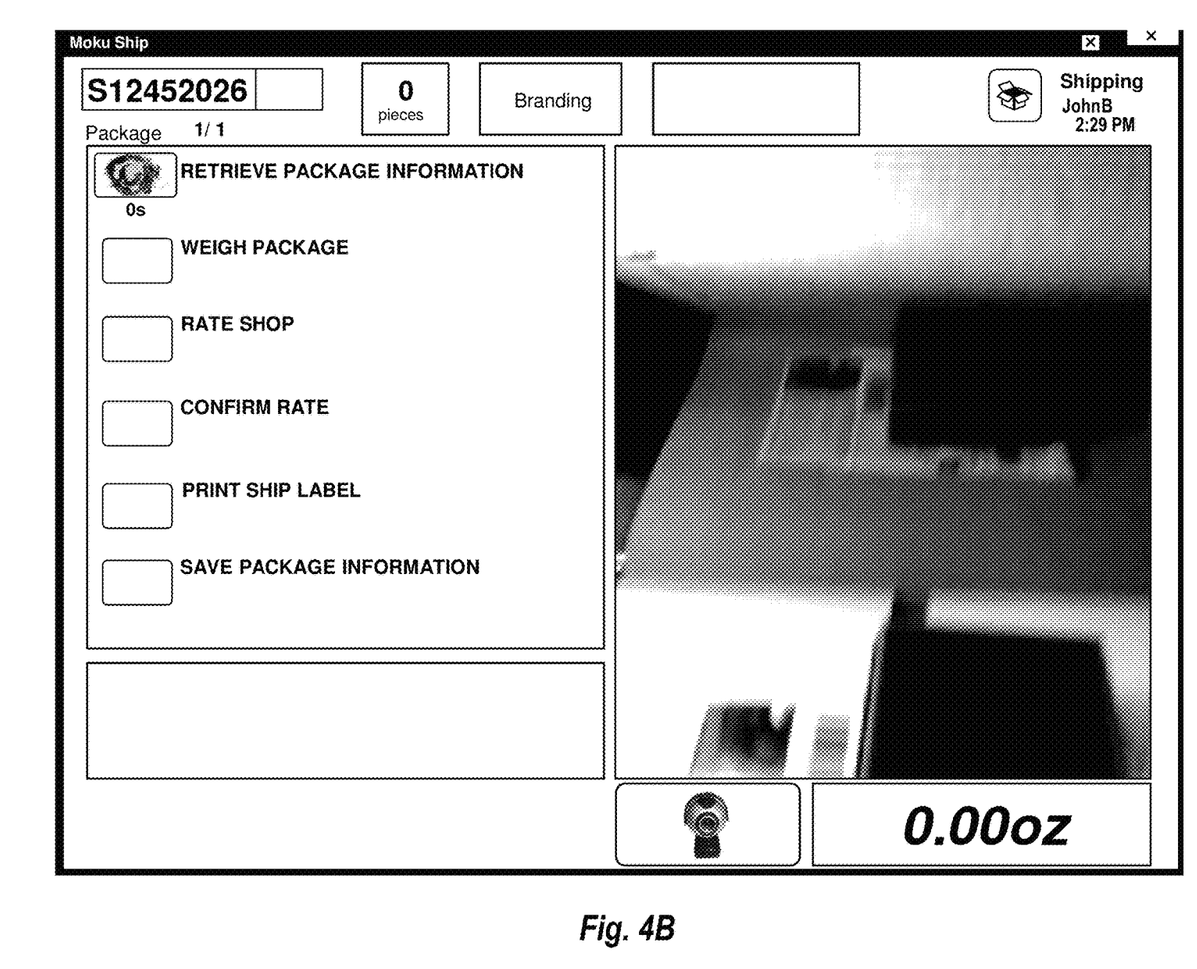

FIG. 4A depicts an exemplary general interface for one or more of the modes that are selectable in the interface of FIG. 3.

The interface of FIG. 4A includes an identifier frame 76 for displaying an identifier associated with the order currently being processed. For example, the identifier may be an identifier number of an order, as read from a barcode attached to the items being processed. A quantity frame 78 may display the number of items in the order, as retrieved from the package database 20 using the identifier.

A branding frame 80 may provide a location for a corporate logo or other branding items to allow the interface to be customized for a particular company or entity. The branding frame 80 may also provide a visual indication of differentiation between orders. For example, if a single fulfillment company fulfills orders for multiple different companies, then the brand of the company associated with the order currently being processed may appear in the branding frame 80. This may serve as a visual reminder to the operator of the workstation 12 to verify that certain special actions are taken, such as packaging the order in packaging materials specific to the company associated with the order.

In another embodiment, the branding frame 80 may be used to identify designated products within the same brand. For example, if a product is associated with a special promotion or subunit of the company fulfilling the orders, then the product may be designated for special treatment (e.g., Valentine's Day orders may be designated to be placed in a red box, rather than a white box which is used for other orders). The branding frame 80 may flag to the operator of the workstation 12 that the shipment has been designated for special treatment.

A feedback frame 82 may present information describing how efficiently the packing system 10 or the operator of the workstation 12 is performing. For example, a histogram may be displayed indicating how many products have been prepared for shipping over time. The histogram may be used for efficiency analyses by the company, or may serve as an incentive for the operator of the workstation 12 to perform more efficiently.

A mode icon 84 may display a visual indicator of which mode the workstation 12 is presently in. Furthermore, an administrative frame 86 may display administrative information, such as the current time, the user presently logged into the workstation 12, and/or a textual description of the mode that the workstation 12 is presently in.

One or more step frames 88 may show the progress of the shipment as the shipment moves through the packaging system 10, as exemplified in FIGS. 4B-4F in the left frame. Each of the step frames 88 may correspond to one or more steps in the process described in FIG. 2. The step frame 88 may include a status indicator 90, which shows whether the associated step has not yet been initiated, is currently operating, or is complete. A time frame 92 may show the amount of time that it takes to complete the step once initiated, and an operation frame 94 may provide a graphical or textual description of the step.

If an error occurs during any of the steps shown in the step frames, an error may be displayed in an error message display frame 96. The text of the error message may be retrieved from an error rule based on which error conditions have been fulfilled. Optionally, an error message may trigger changes to the interface, such as popping up a window for supervisor authorization in response to processing an international shipment.

A first camera display frame 98 may provide an area for viewing the output of a first camera. For example, the first camera may be located at the packager 22 and may provide a view of the product as it is being inserted into the packaging. Optionally, a second camera display 100 frame may be displayed in conjunction with the first camera display. For example, the second camera display frame 100 may display a view from a camera located at an output of the packing machine 14. If only one camera is currently activated, then the display for the inactive camera may either be blank, or the display for the active camera may be extended to utilize the area designated for the inactive camera. For example, if the second camera is inactive, then the first camera display frame 98 may extend to cover the area designated for both the first camera display frame 98 and the second camera display frame 100. The camera display frames 98, 100 may include any number of frames, depending on the number of active cameras.

A camera toggle icon 102 may be used to change the active state or display state of one or more cameras. For example, activating the camera toggle icon 102 may cycle through available camera display options, such as: (1) first camera active, second camera inactive; (2) first camera active, second camera active; (3) first camera inactive, second camera active; and (4) all cameras inactive.

In another embodiment, the camera toggle icon 102 may allow a view to be switched from the camera mode to an order description mode in which graphical or textual information describing the order may be shown. In yet another embodiment, the camera toggle icon 102 may switch the camera view from a frame-based view to a full-screen view.

A weight output frame 104 may display a weight of the order being processed, as received from a scale 36. Optionally, the weight output frame 104 may be customizable or may be toggled between different weight settings, such as weight units (e.g., pounds/ounces/kilograms).

Figure 4C:
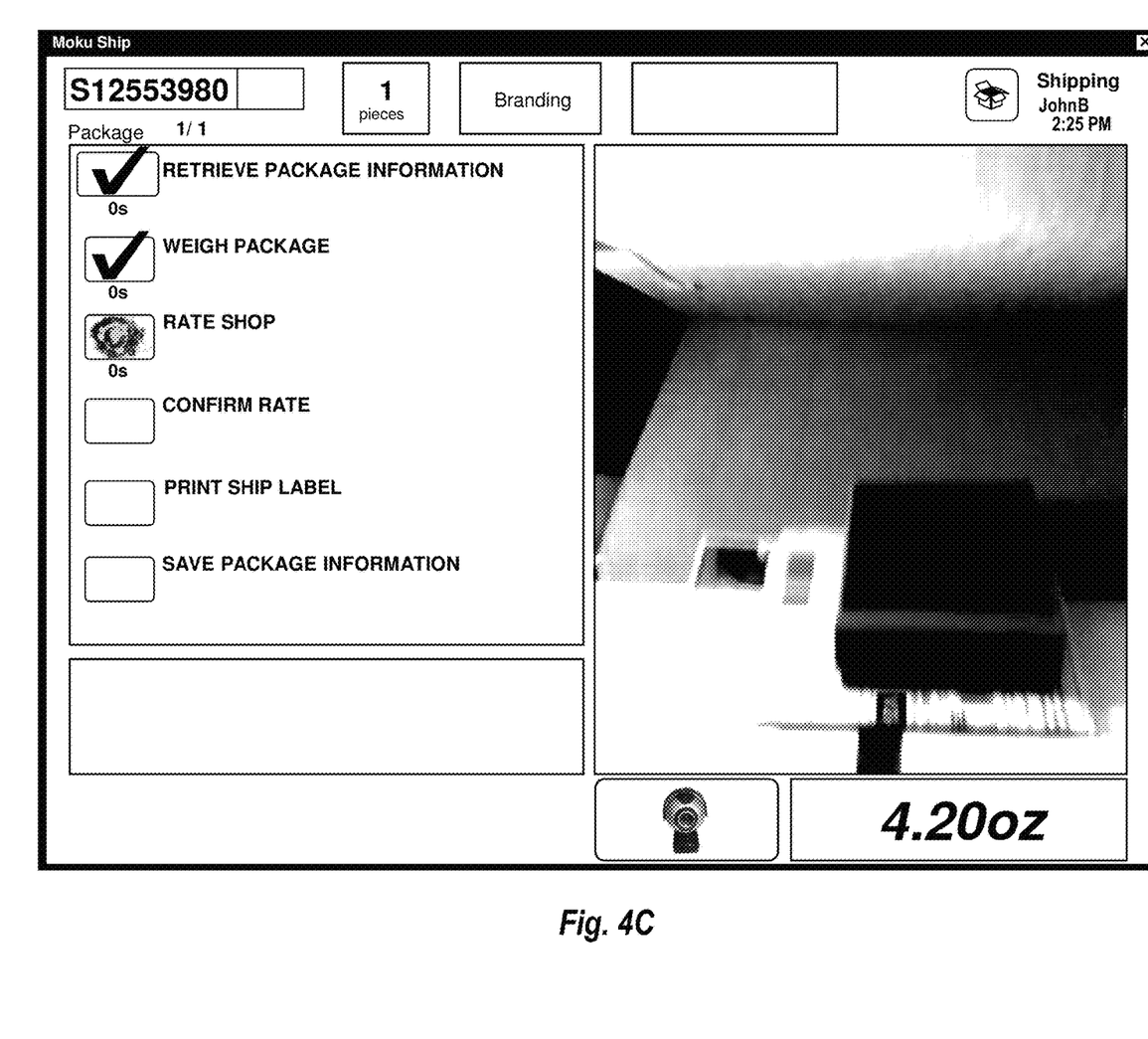
Figure 4D:
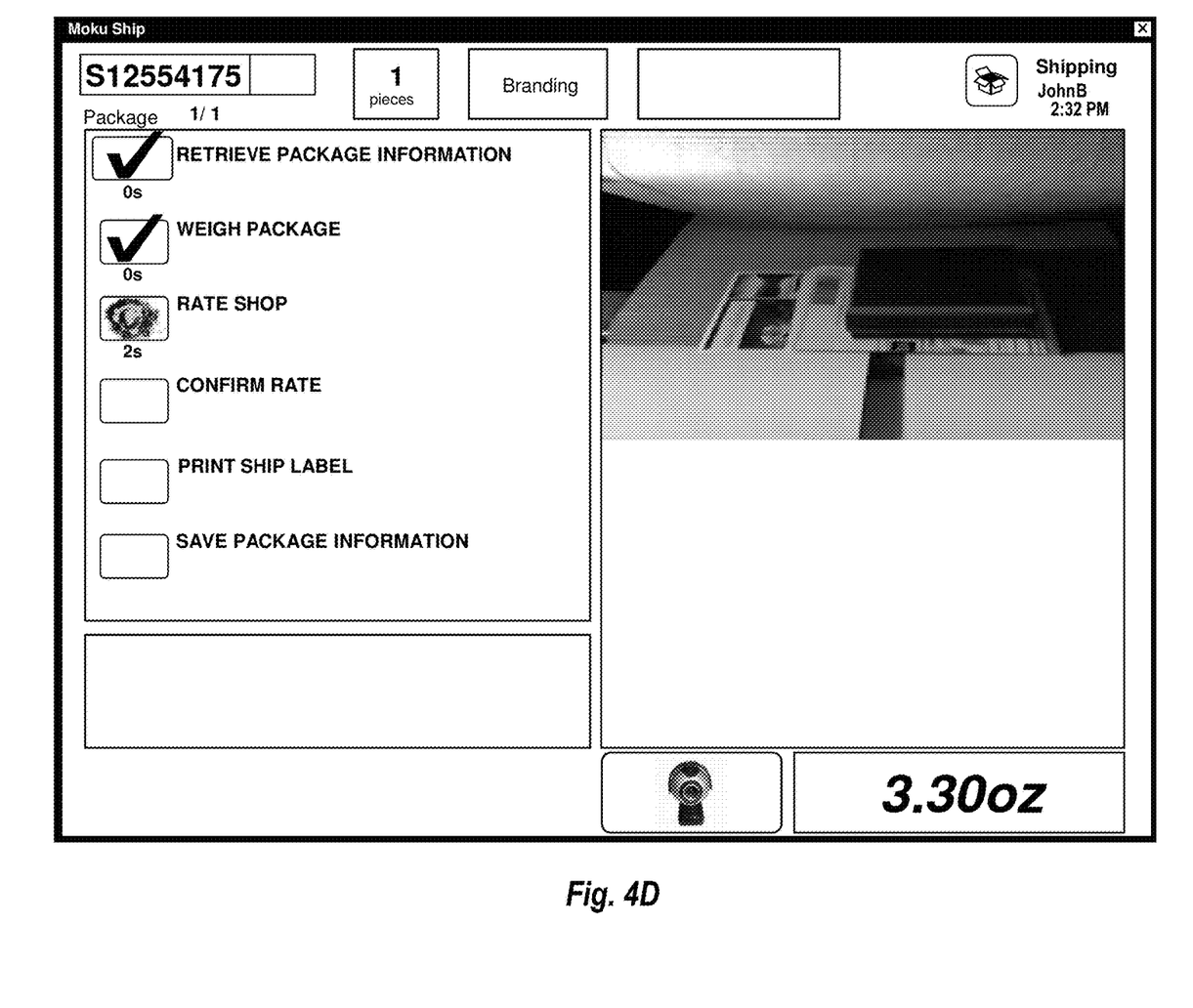
Figure 4E:
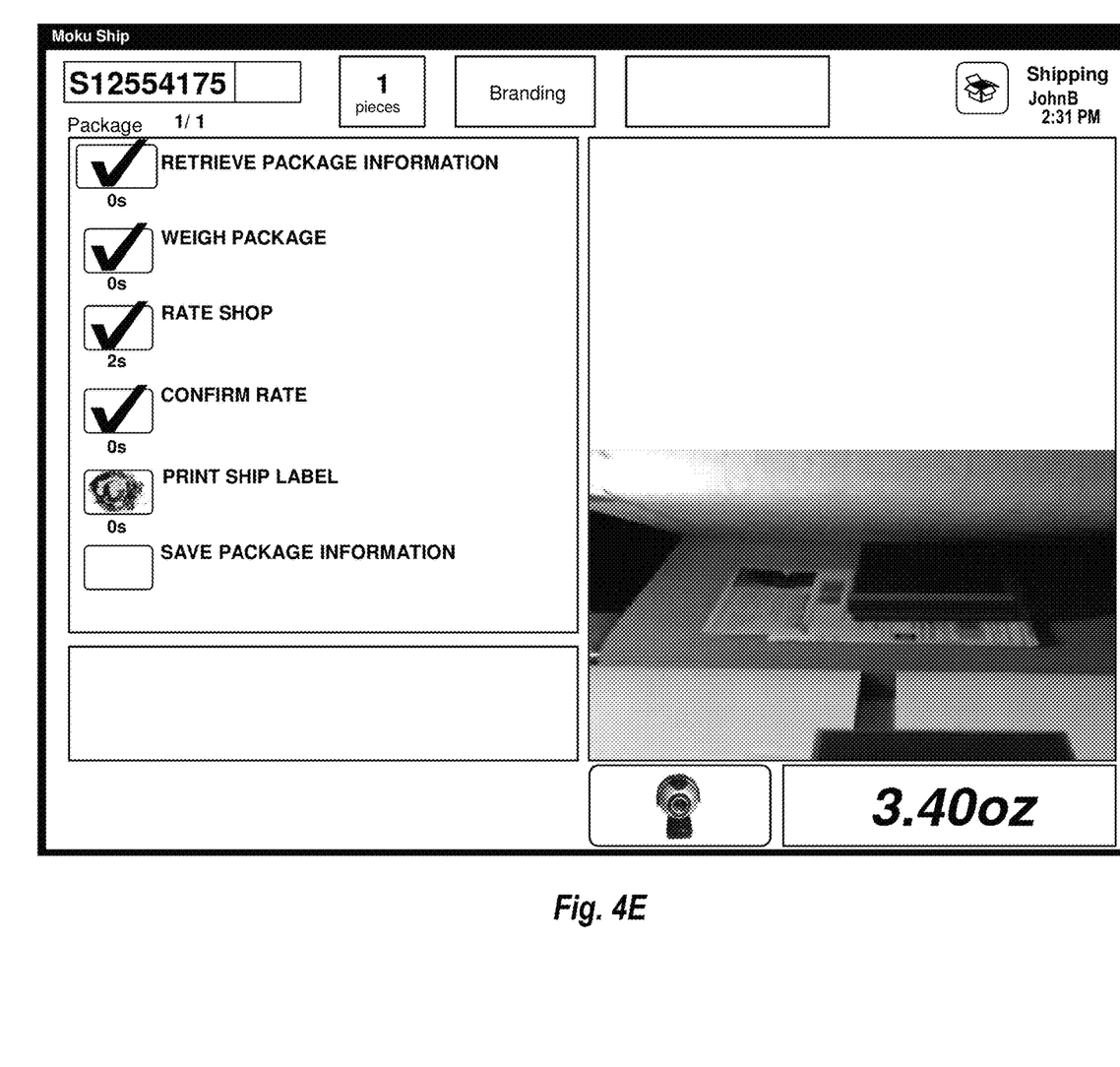
Figure 4F:
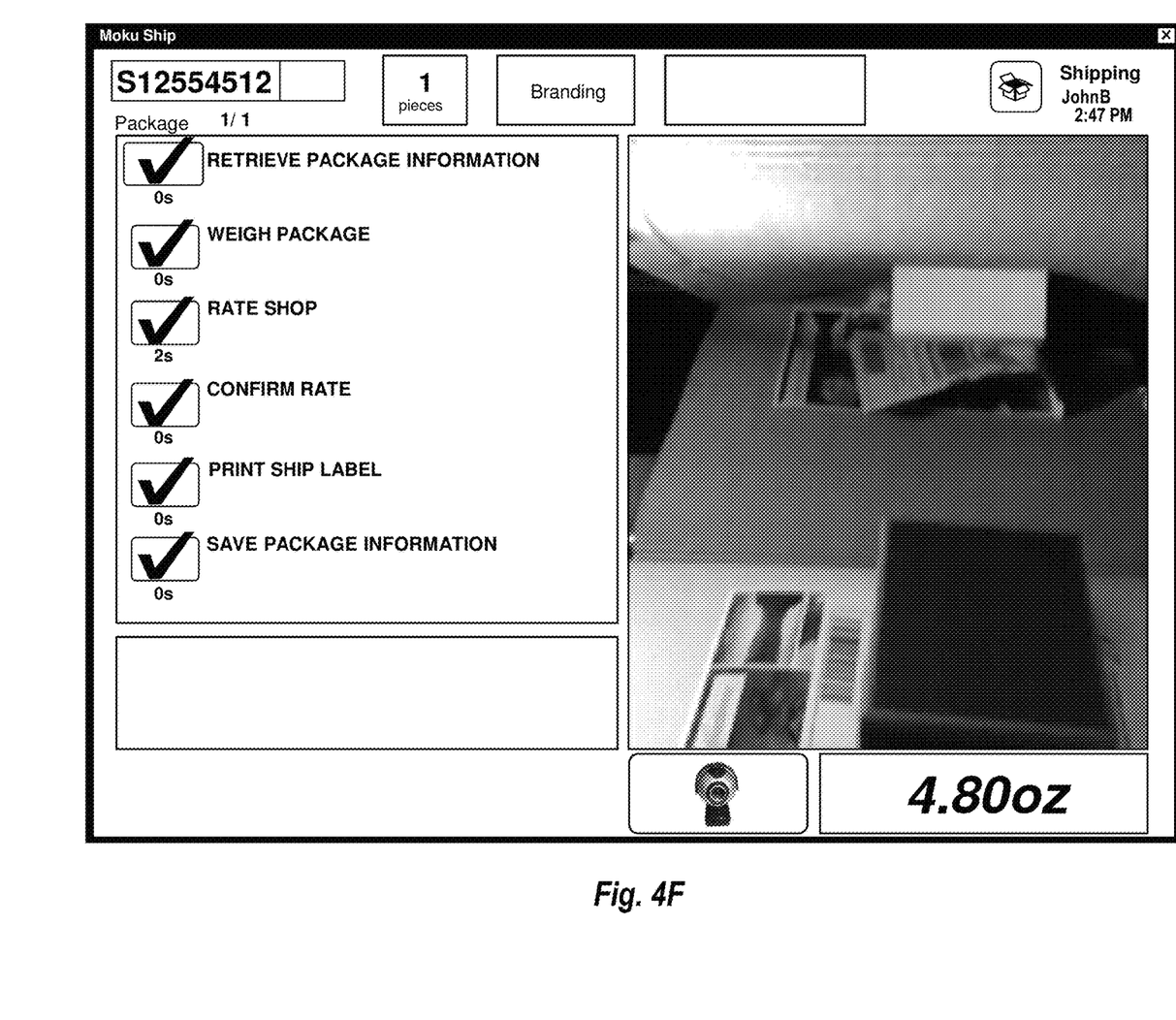

FIGS. 4B-4F depict the interface of FIG. 4A at various steps of the process shown in FIG. 2. For example, FIG. 4B corresponds to step 52 (retrieving package information from the package database 20); FIG. 4C corresponds to step 58 (retrieving postage information from the postage database 40); FIG. 4D also corresponds to step 58, and depicts a situation where the camera mode has been changed from the camera mode depicted in FIG. 4C; FIG. 4E corresponds to step 62 (print label(s) for the product) and also involves a change in camera mode from FIG. 4D; and FIG. 4F corresponds to step 64 (updating the package information stored in the package database).

Figure 5:
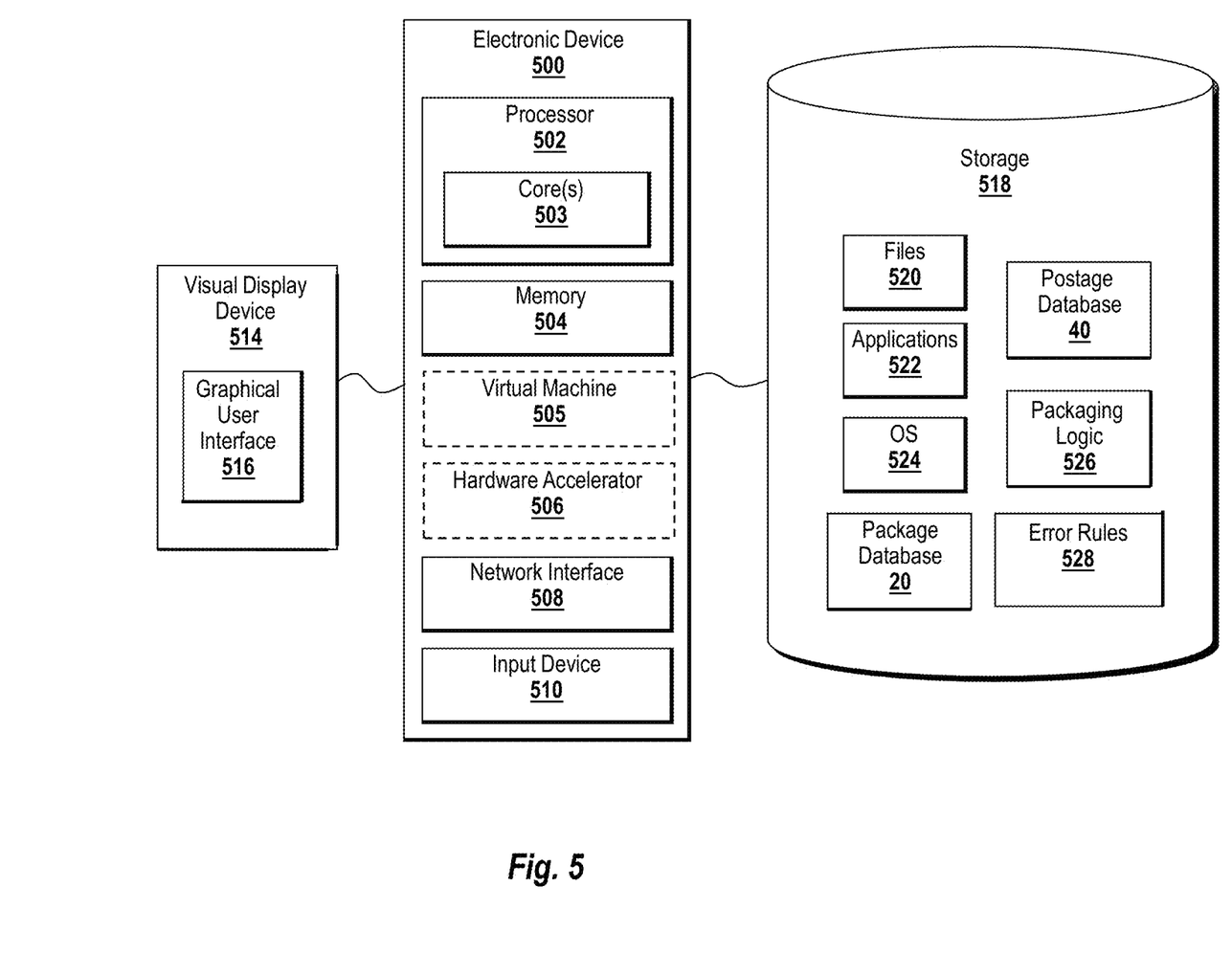
FIG. 5 depicts an exemplary computing device suitable for use with exemplary embodiments.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 5 depicts an example of an electronic device 500 that may be suitable for use with one or more acts disclosed herein.

The electronic device 500 may take many forms, including but not limited to a computer, workstation, server, network computer, quantum computer, optical computer, Internet appliance, mobile device, a pager, a tablet computer, a smart sensor, application specific processing device, etc.

The electronic device 500 is illustrative and may take other forms. For example, an alternative implementation of the electronic device 500 may have fewer components, more components, or components that are in a configuration that differs from the configuration of FIG. 5. The components of FIG. 5 and/or other figures described herein may be implemented using hardware based logic, software based logic and/or logic that is a combination of hardware and software based logic (e.g., hybrid logic); therefore, components illustrated in FIG. 5 and/or other figures are not limited to a specific type of logic.

The processor 502 may include hardware based logic or a combination of hardware based logic and software to execute instructions on behalf of the electronic device 500. The processor 502 may include logic that may interpret, execute, and/or otherwise process information contained in, for example, the memory 504. The information may include computer-executable instructions and/or data that may implement one or more embodiments of the invention. The processor 502 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 503. Moreover, the processor 502 may include a system-on-chip (SoC) or system-in-package (SiP).

The electronic device 500 may include one or more tangible non-transitory computer-readable storage media for storing one or more computer-executable instructions or software that may implement one or more embodiments of the invention. The non-transitory computer-readable storage media may be, for example, the memory 504 or the storage 518. The memory 504 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (Fe-RAM) devices, magneto-resistive RAM (MRAM) devices, phase change memory RAM (PRAM) devices, or other types of RAM devices.

One or more computing devices 500 may include a virtual machine (VM) 505 for executing the instructions loaded in the memory 504. A virtual machine 505 may be provided to handle a process running on multiple processors so that the process may appear to be using only one computing resource rather than multiple computing resources. Virtualization may be employed in the electronic device 500 so that infrastructure and resources in the electronic device may be shared dynamically. Multiple VMs 505 may be resident on a single computing device 500.

A hardware accelerator 506, may be implemented in an ASIC, FPGA, or some other device. The hardware accelerator 506 may be used to reduce the general processing time of the electronic device 500.

The electronic device 500 may include a network interface 508 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 508 may include a built-in network adapter, network interface card, personal computer memory card international association (PCMCIA) network card, card bus network adapter, wireless network adapter, universal serial bus (USB) network adapter, modem or any other device suitable for interfacing the electronic device 500 to any type of network capable of communication and performing the operations described herein.

The electronic device 500 may include one or more input devices 510, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 500 may include other suitable I/O peripherals.

The input devices 510 may allow a user to provide input that is registered on a visual display device 514. A graphical user interface (GUI) 516 may be shown on the display device 514.

A storage device 518 may also be associated with the computer 500. The storage device 518 may be accessible to the processor 502 via an I/O bus. The information may be executed, interpreted, manipulated, and/or otherwise processed by the processor 502. The storage device 518 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 518 may further store files 520 in a file system, as well as applications 522. The electronic device 500 may run an operating system (OS) 524. Examples of OS 524 may include the Microsoft® Windows® operating systems, the Unix and Linux operating systems, the MacOS® or iOS® for Apple computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

The storage device 518 may further store a package database 20 and/or a postage database 40, as described above with respect to FIG. 1. The storage device 518 may also store packaging logic 526 for carrying out a shipping procedure, such as the exemplary procedure depicted in FIG. 2. Furthermore, the storage device 518 may store error rules 528, such as the error rules described above with respect to FIGS. 2 and 3.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless otherwise stated.

It is intended that the invention not be limited to the particular embodiments disclosed above, but that the invention will include any and all particular embodiments and equivalents falling within the scope of the following appended claims.

The invention claimed is:

1. A packaging system comprising:
    a conveyor for conveying a product associated with a customer order through the packaging system;
    a packager for placing the product in packaging to create a packaged product;
    a package database storing information related to an order;
    a printer for printing shipping information on at least one of a label or the packaged product, the printing being performed based at least in part on information in the package database;
    a scale for measuring a weight of the product;
    a link to a postage database storing postage rates;
    a single workstation comprising a display and a multi-modal interface for linking the workstation to at least the sensor, the scale, the package database, and the postage database, wherein the multi-modal interface includes a first user interface that aggregates together in a single user interface a plurality of user selectable operating modes that are displayed simultaneously, wherein the plurality of operating modes includes:
        a pack and print mode wherein the product is placed in the packaging by the packager and the printer generates the label based on information in the package database;

a look up mode wherein the display displays information from the package database for a selected order;

a shipping mode wherein the workstation searches the postage database based on the information related to the order stored in the package database and the weight measured by the scale, and returns postage information to be used to ship the product; and a combined mode for selecting a combination of the pack mode, the look-up mode, and the shipping mode.

2. The system of claim 1, further comprising an operating mode interface displayed on the display once the user selects one of the plurality of operating modes from the multimodal interface, wherein the operating mode interface has a plurality of frame elements forming a single user interface that are arranged in the single user interface to display selected information, the plurality of frame elements including:

an identifier frame element for displaying information associated with an identifier associated with the customer order, at least one step frame element for visually displaying a status of the product when passing through the packaging system, at least one camera frame element for displaying a picture of the product from a camera when passing through the packaging system, an error frame element for displaying an error message associated with the product when passing through the packaging system, and a product weight frame element for displaying a weight of the product.

3. The system of claim 2, wherein the plurality of frame elements further comprises a quantity frame element for displaying a quantity of the products associated with the customer order.

4. The system of claim 3, wherein the plurality of frame elements further comprises a mode frame element for visually displaying the operating mode being performed by the packaging system.

5. The system of claim 4, wherein the plurality of frame elements further comprises a branding frame element for displaying information associated a brand.

6. The system of claim 5, wherein the plurality of frame elements further comprises a feedback frame element for displaying information associated with a user of the packaging system.

7. The system of claim 1, wherein the plurality of operating modes further comprises a bulk mode where a plurality of the same products are placed into packaging.

* * * * *